Figure 2:
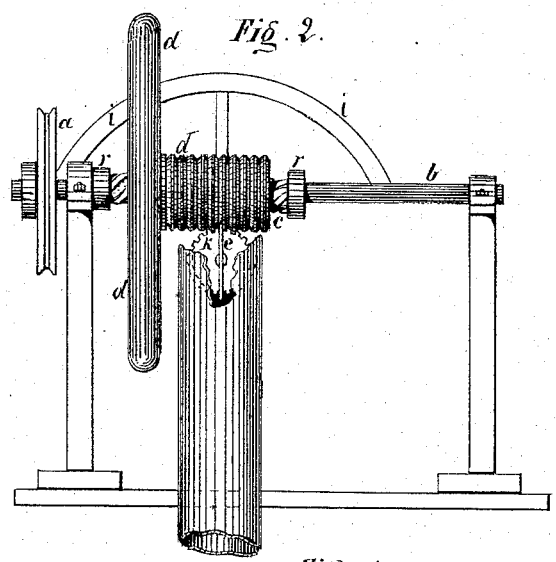
Figure 1:
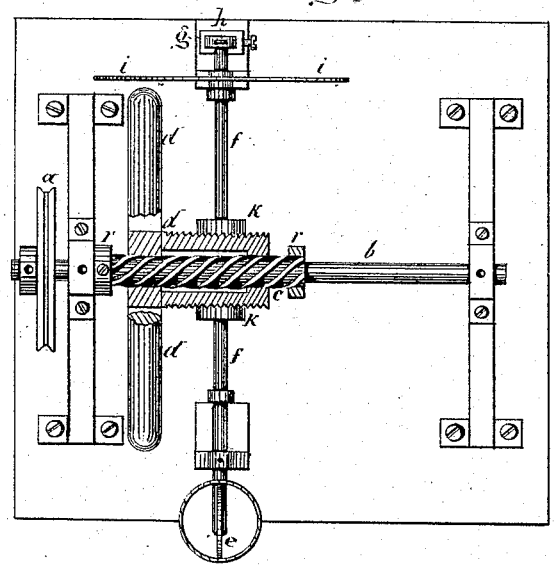

M. MUCHIN.
Governors for Steam-Engines.

No. 158,300.  Patented Dec. 29, 1874.

2 Sheets--Sheet 1.

Witnesses.  Inventor:
Jno. J. Hollister, Jr.  Matthew Muchin
Wm. Beale Nalr.  p. Henry Orth
 att'y M. MUCHIN.
Governors for Steam-Engines.
No. 158,300. Patented Dec. 29, 1874.
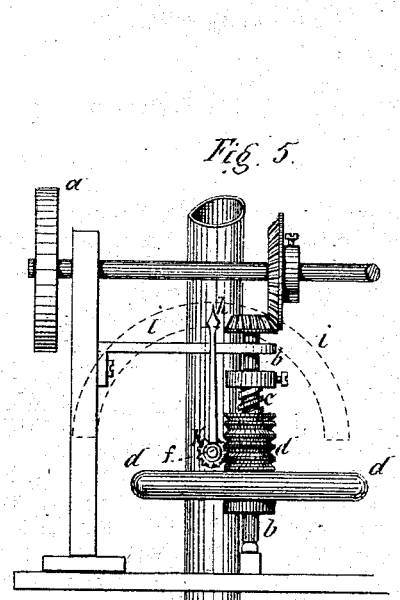
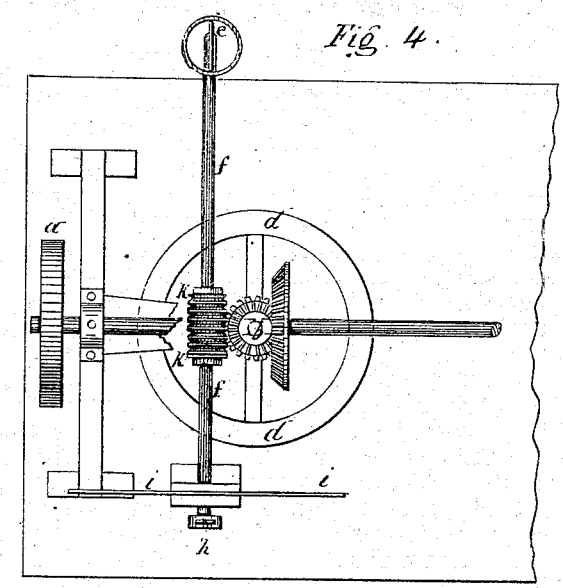
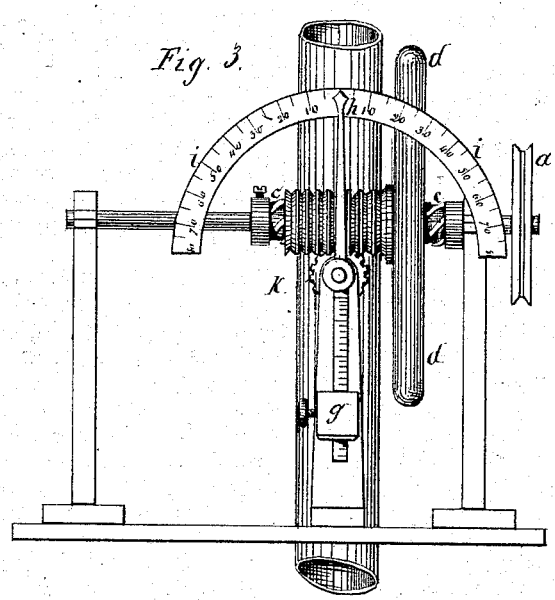

UNITED STATES PATENT OFFICE.

MATTHEW MUCHIN, OF RIGA, RUSSIA.

IMPROVEMENT IN GOVERNORS FOR STEAM-ENGINES.

Specification forming part of Letters Patent No. 158,300, dated December 29, 1874; application filed November 3, 1874.

*To all whom it may concern:*

Be it known that I, MATTHEW MUCHIN, of Riga, Empire of Russia, have invented Improvements on Regulators for Steam-Engines, of which the following is a specification:

My invention relates to improvements in the construction of regulators for steam-engines, of which the working, as shown in the annexed drawings, is based on the principle of inertia, viz., "every moving body tends to keep at its instantaneous speed."

My regulator is constructed as follows: A horizontal shaft, $b$, is set in rotation by means of a belt acting on the wheel $a$. The shaft $b$ is made with a multiplex-thread screw of a large pitch. The prolonged nave of a small fly-wheel, $d$, acts as a screw-nut for the screw $c$. The movement of the fly-wheel $d$ along the threaded part of the shaft C is limited by two rings, $r\ r$, fixed at suitable distances. Thus the shaft C, driven by the wheel $a$, which is set in motion by the principal shaft of the engine by means of a belt, gives to the screw-nut $d$, and consequently to the fly-wheel $d$, by reason of the friction existing between the screw $c$ and the screw-nut $d$, the rotatory motion, of which the speed soon becomes equal to that of the shaft C. If, however, a changement occurs in the speed of the engine, and, consequently, in that of the shaft C, which be so great that the corresponding force on the circumference of the screw $c$ exceeds the friction between the screw $c$ and the nut $d$, determined by the known properties of the screw, the fly-wheel $d$, by reason of its inertia, will drive the screw-nut $d$ backward or forward along the threaded part of the shaft $b$. The screw-nut and fly-wheel $d$ recoil when the speed of the engine increases, and advance when this speed diminishes. This motion of the fly-wheel $d$ acts upon the steam-damper or regulating-valve by means of the pinion $k$, keyed to the axle $f$ of the valve $e$. The exterior surface of the screw-nut $d$ is provided with transversal grooves, which gear into the teeth of the pinion $k$ and set it in motion. To indicate the position of the valve $e$ in the steam-pipe, the axle $f$ is provided with a hand, $h$, which turns before a fixed scale, $i$.

In order that the regulator thus constructed keep its normal position—*i. e.*, that it be static—a weight, $g$, is placed at the lower end of the hand $h$, of which the action on the axle $f$ augments as this weight rises, and which brings back the valve $e$ into its primitive position.

Fig. 4 represents a modification in the construction of this regulator. In this case the weight $g$ is dispensed with. The pitch of the screw $c$ is less than in the preceding cases, and the shaft C is vertical. This shaft is set in rotation by means of the toothed bevel-wheels $s$ and the wheel $a$. The fly-wheel $d$ rises on the shaft $b$ when the speed of the engine increases, and falls when this speed slackens. The action of the fly-wheel on the valve $e$ is the same as above, and is effected by means of the pinion $k$, fixed to the axle $f$ of the valve.

I have applied this regulator to the engine of a small steamer, as also to a horizontal engine of twenty-horse power, in both of which cases the effect of the regulator was quite satisfactory.

I claim as my invention—

The shaft $b$, constructed substantially as shown and described, the wheel $d$ having its hub threaded on the inside to correspond with the threads formed on the shaft $b$, and its outer periphery also threaded to gear with the wheel K, in combination with the wheel $k$, shaft $f$, index $h$, index-plate $i$, and a damper or valve, $e$, all arranged to operate substantially as and for the purposes shown and described.

In testimony that I claim the foregoing I have hereunto set my hand this 6th day of July, 1874.

MATTHEW MUCHIN.

Witnesses:
 CHARLES LOVIS,
 JOHN HAUSMANN.